April 26, 1966  D. A. KOHL  3,247,595
VISUAL COLLIMATING DEVICE AND PROCESS
Filed July 19, 1963
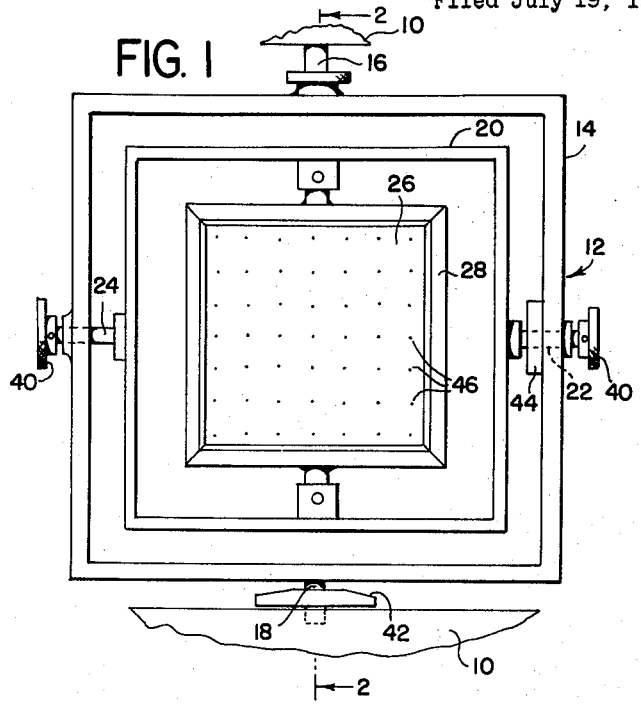
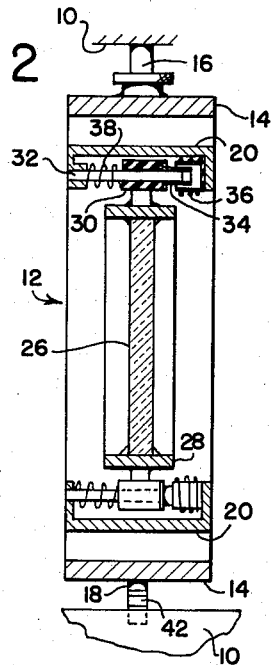
FIG. 1
FIG. 2
FIG. 3
FIG. 4
FIG. 5
FIG. 6
INVENTOR.
DOUGLAS A. KOHL
BY Robert B. Hughes
ATTORNEY

United States Patent Office 3,247,595
Patented Apr. 26, 1966

3,247,595
VISUAL COLLIMATING DEVICE AND PROCESS
Douglas A. Kohl, Osseo, Minn., assignor, by mesne assignments, to Litton Systems, Inc., Beverly Hills, Calif., a corporation of Maryland
Filed July 19, 1963, Ser. No. 296,270
11 Claims. (Cl. 33—46)

This invention relates to the art of visual alignment or collimation and to a process and apparatus relating thereto.

It is an object of the present invention to provide an improved device and process of the type indicated above, whereby a viewer is continuously presented with a broad field of vision, and is able, without losing this field of vision, to ascertain the alignment of one or more objects or targets therewithin.

FIGURE 1 is a front elevational view of a collimating apparatus embodying preferred teachings of my invention, FIGURE 2 is a longitudinal sectional view taken on line 2—2 of FIGURE 1, and FIGURES 3 through 6 are fragmentary front elevational views of a localized portion of the viewing screen of said apparatus, illustrating various ways in which an object within the scope of the screen may appear, depending upon the alignment of the screen therewith.

Referring to the accompanying drawing, numeral 10 designates generally a foundation or base member which is stationary with the environment (e.g. a building or other ground location, a ship, etc.) with respect to which alignment of an object or target is to be ascertained. Mounted to this base 10 is a gimbal frame, generally designated 12, comprising a first outer member or ring 14 pivotally mounted at 16 and 18 to the base 10 for angular movement about a vertical axis and a second inner member or ring 20 mounted at 22 and 24 to the outer ring 14 for angular movement about a horizontal axis. A transparent, generally planar, rectangular viewing plate or screen 26 is mounted within and is generally coplanar with, the second ring member 20 for reciprocating motion therein along a line perpendicular to the plane of the screen 26 (and consequently perpendicular to the general plane occupied by the ring or frame 20). This mounting is conveniently accomplished by fixing the screen 26 to a border frame 28 located within the second ring member 20 and having an upper and lower slide journal 30 interfitting with respective longitudinal rods 32 in the second gimbal frame 20.

To cause this viewing screen 26 with its frame 28 to so oscillate in the second gimbal ring 20, there is secured to each slide journal 30 a related one of two core members 34 interfitting with a related one of two coils 36 secured to the frame 20. The coils 36 are connected to a suitable source of alternating current of the frequency at which it is desired to oscillate the screen 26. If desired, a coil spring 38 can be sleeved on each rod 32 to properly locate the frame 28 when the coils 36 are not excited and/or to cushion the oscillations of the frame 28, and/or to cause movement of the frame 28 and screen 26 on each half cycle of reciprocation.

At each of the journal mountings 22 and 24 of the second gimbal member 20 is a related one of a pair of knurled handles or knobs 40 by which the second gimbal frame 20 can be rotated about its horizontal axis of rotation. By pushing or pulling either of the handles 40, the outer gimbal frame 14 can be rotated about its vertical axis. If desired, a pair of fine adjusting screws (not shown, but such as those used in a conventional surveyor's transit) could be utilized for precise angular positioning of both the inner and outer gimbal frames 20 and 14.

Suitable position indicators are provided for both the inner and outer gimbal frames 20 and 14. These could be a pair of angular scales located one at either of the inner frame mounting locations 22 or 24, and the other at either of the outer frame mounting locations 16 or 18. If the collimating device is used to continuously obtain the alignment of a moving target such as an airplane, angular positioning pick-off devices could be used to continuously communicate the angular positions of the gimbal frames 20 and 14. Thus position indicating means are shown merely schematically at 42 and 44 located respectively, at 18 and 22, to illustrate that positioning means of an appropriate type are provided to obtain both azimuth and elevation of the screen 26.

Embossed or otherwise marked over substantially the entire viewing screen 26 are a plurality of regularly spaced alignment reference points or dots 46. Desirably, these points (or other convenient aligning means such as grid marks, etc.) should be located with sufficient frequency over the viewing screen 26 so that a person viewing an object through any portion of the screen 26 will find an alignment reference (i.e. point or points 46, as shown herein) quite close to his line of vision. On the other hand, these aligning points 46 should be sufficiently small and spaced sufficiently so that the screen 26 provides a substantially unobstructed view therethrough.

In operation, alternating current is fed to the coils 36 so that the screen 26 reciprocates within the second gimbal member 20 along a rectilinear path perpendicular to the plane of this screen 26. This frequency of oscillation should be within the flicker frequency of the observer, which for most humans is within a range of approximately fifteen to twenty cycles per second. The operator directs his vision toward (i.e. generally perpendicular to) the screen's viewing plane (which is the plane occupied by the screen 26) and by means of the handles or knobs 40 manipulates the screen 26 so that the broad field of vision presented by the screen 26 contains the object and/or objects or targets with respect to which the operator wishes to obtain alignment.

The viewer then directs his sight toward a selected object, the alignment of which is to be ascertained, and while doing so, takes note of the disposition of the reference points or dots 46 nearest his line of sight. If these aligning points 46 appear as stationary dots (as in FIGURE 6), the oscillating path of the viewing screen 26 is parallel to the line of sight of the viewer, and the screen 26 is thus perpendicular to the path of alignment of this selected object. The angular indicating means 42 and 44 (i.e. angular scales or pick-off devices, etc.) indicate both the azimuth and elevation of the inner gimbal frame 20 and, from these, the oscillating path of the screen 26 can be determined.

If the oscillating path of the viewing screen 26 is not so aligned with the line of sight of the viewer, the points or dots 46 nearest the line of sight of the viewer will blur or become indistinct and appear to flicker generally along a line parallel to a plane containing the sides of the angle along which the position of the screen 26 must be corrected to properly align this screen 26 with the target being viewed. As seen in FIGURE 3, the points 46 adjacent the target 48 (as illustrated herein, an airplane) appear to blur into vertical lines, and this indicates that the elevation of the screen 26 must be adjusted by turning handles 40. In FIGURE 4, the points 46 flicker along a horizontal line, and accordingly the azimuth of the screen 26 must be adjusted, by rotating the outer gimbal frame 14 about its vertical axis. FIGURE 5 illustrates the appearance of the dots or points 46 when the alignment of the screen 26 must be corrected with respect to both azimuth and elevation.

As before indicated, the viewing screen 26 is oscillated within the range of the flicker frequency of the viewer. It is at this frequency that the oscillations of the dots or points 46 are most noticeable, and hence this is the most desirable frequency at which to so reciprocate the screen 26 to detect misalignment between line of sight to the target and the oscillating path of the screen 26.

Now therefore I claim:

1. A visual collimating device comprising:
    (a) a support frame,
    (b) a transparent viewing screen occupying generally a viewing plane and mounted on said frame for oscillating rectilinear motion along a path having a substantial path component perpendicular to said plane and so disposed as to present a substantially unobstructed view beyond said device,
    (c) said screen having visible alignment reference means thereon,
    (d) means to oscillate said screen along said path at a predetermined frequency and,
    (e) directing means operatively connected to said screen by which the oscillating path of said screen can be directed along a selected line.

2. The device as recited in claim 1, wherein there are indicating means to ascertain the alignment of the path along which said screen is oscillating.

3. The device as recited in claim 1, wherein the oscillating path of said screen is fixed with respect to said frame, and said directing means functions so that the angular position of said frame is changed.

4. The device as recited in claim 3, wherein there is another frame rotatably mounted about a first axis from a base member, said support frame being rotatably mounted from said other frame about a second axis skewed with respect to said first axis.

5. The device as recited in claim 1, wherein said alignment reference means comprises visible markings located over a substantial portion of said screen and spaced at frequent intervals thereover while permitting a substantially unobstructed view through said screen.

6. The device as recited in claim 1, wherein said oscillating means is such that said screen can be oscillated within a viewer's flicker frequency.

7. A visual collimating device comprising:
    (a) a first frame member mounted for angular motion about a first axis,
    (b) an intermediate support frame member mounted on said first frame member for angular movement therewith about a second axis, whereby said intermediate member may be moved angularly with respect to both azimuth and elevation,
    (c) a transparent viewing screen occupying a general viewing plane and mounted from said intermediate frame for oscillating motion along a rectilinear path predetermined with respect to said intermediate frame and having a substantial path component perpendicular to the viewing plane of said screen and so disposed as to present a substantially unobstructed view beyond said device,
    (d) said screen having visible alignment reference means thereon,
    (e) means to oscillate said screen along said path at a frequency at least as high as a viewer's flicker frequency,
    (f) indicating means by which the alignment of said oscillating path is ascertained.

8. The device as recited in claim 7, wherein said indicating means is operatively associated with said frames so as to be responsive to the angular positions thereof and thus indicate the oscillating path of said screen.

9. A process for ascertaining the alignment of an object in a relatively large field of view, comprising:
    (a) oscillating along a rectilinear path a transparent screen presenting a relatively large field of view, which screen has visible alignment reference means over a substantial portion thereof,
    (b) manipulating the screen so as to direct the oscillating path thereof in a manner that the portion of the alignment reference means which is proximate to the line of vision of a viewer who is observing through said screen an object whose alignment is to be ascertained, has substantially no apparent motion, and
    (c) ascertaining the alignment of the oscillating path of said screen.

10. The process as recited in claim 9, wherein said screen is oscillated at a frequency at least as high as said viewer's flicker frequency.

11. The process as recited in claim 9, wherein said screen is oscillated at a frequency within said viewer's flicker frequency.

References Cited by the Examiner

UNITED STATES PATENTS

| | | | |
|---|---|---|---|
| 2,063,687 | 12/1936 | Lefrand | 40—139 |
| 2,914,855 | 12/1959 | Daum | 33—74 |
| 2,982,179 | 5/1961 | Lace | 88—73 |
| 2,996,625 | 8/1961 | De Neergaard | 33—46 X |
| 3,191,305 | 6/1965 | Gamertsfelder | 33—47 |

FOREIGN PATENTS 1,501    1877    Great Britain.

ISAAC LISANN, *Primary Examiner.*